(No Model.) 11 Sheets—Sheet 4.

W. E. WILLIAMS.
MACHINE FOR MAKING MATCH BOXES.

No. 574,842. Patented Jan. 5, 1897.

Witnesses:
Fred. Borg.
Frank Murphy.

Inventor:
W. E. Williams (No Model.) 11 Sheets—Sheet 5.

W. E. WILLIAMS.
MACHINE FOR MAKING MATCH BOXES.

No. 574,842. Patented Jan. 5, 1897.

Witnesses
Fred Borg
Frank Murphy

Inventor
W. E. Williams (No Model.) 11 Sheets—Sheet 6.

W. E. WILLIAMS.
MACHINE FOR MAKING MATCH BOXES.

No. 574,842. Patented Jan. 5, 1897.

Witnesses
Fred Borg
Frank Murphy.

Inventor
W. E. Williams (No Model.) 11 Sheets—Sheet 7.
W. E. WILLIAMS.
MACHINE FOR MAKING MATCH BOXES.
No. 574,842. Patented Jan. 5, 1897.
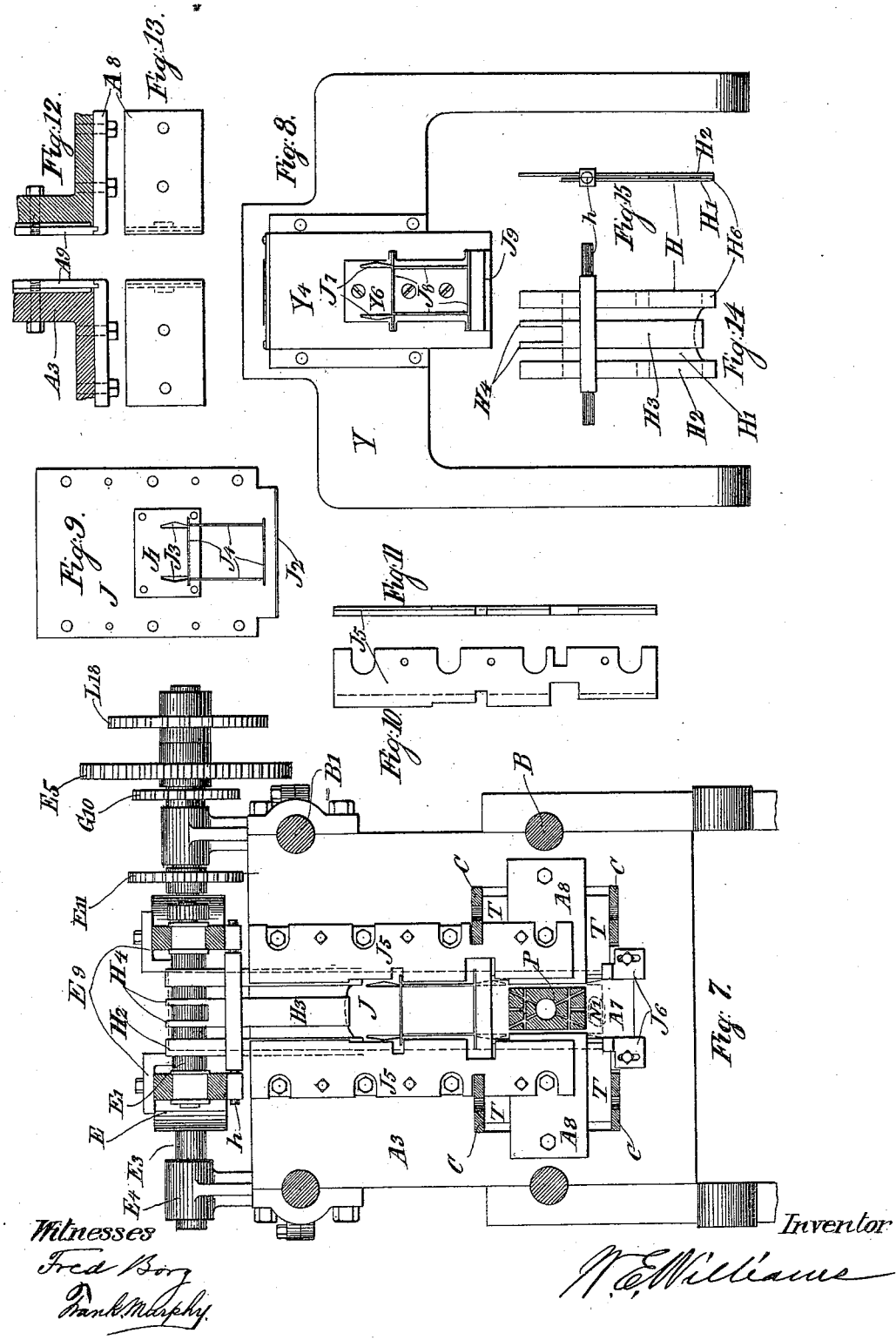

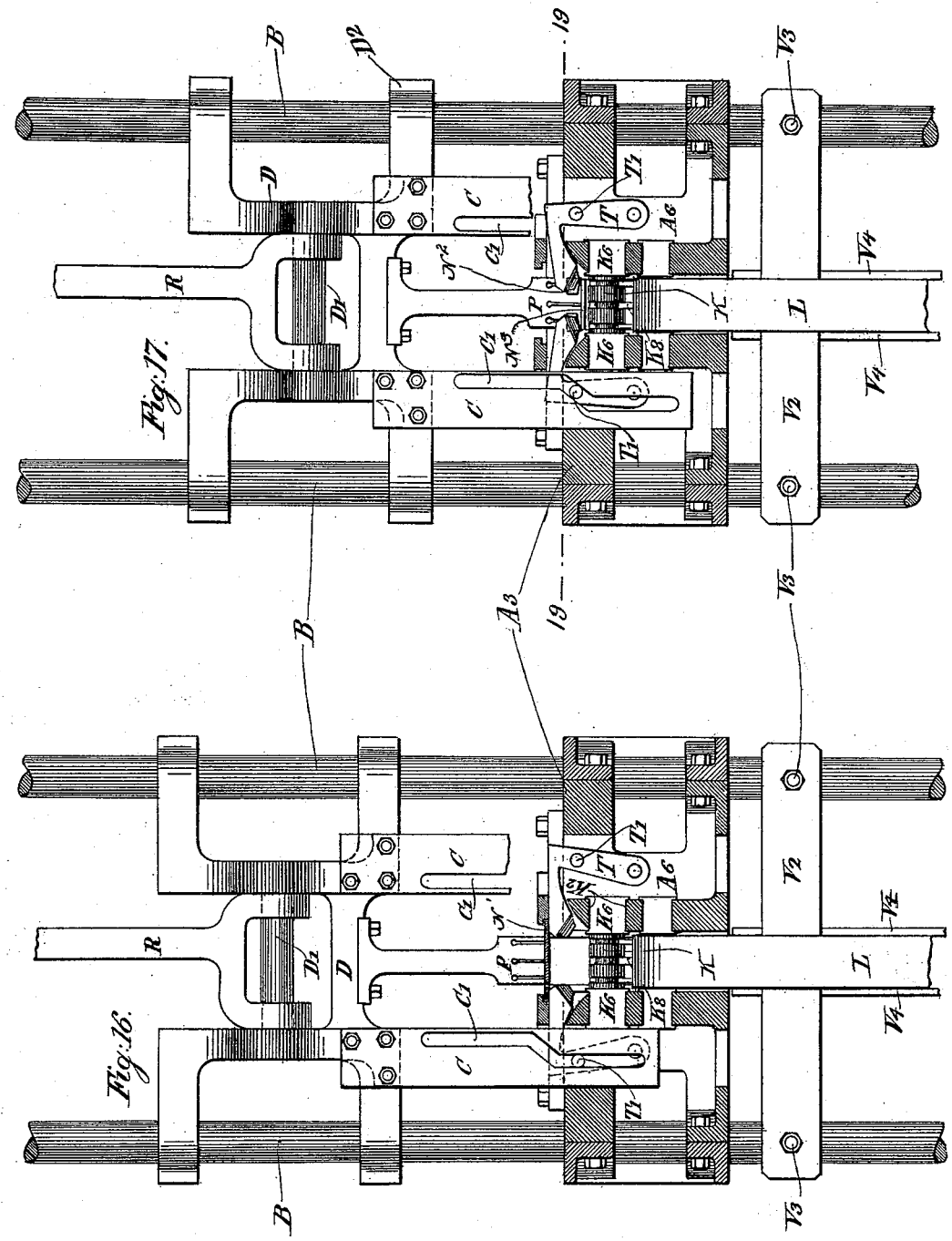

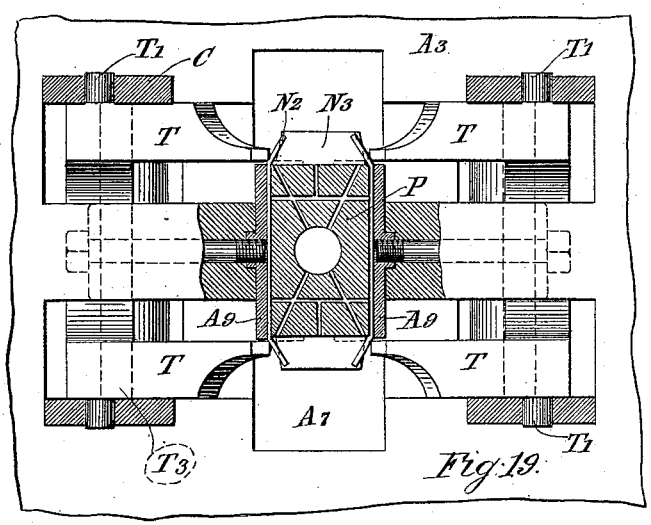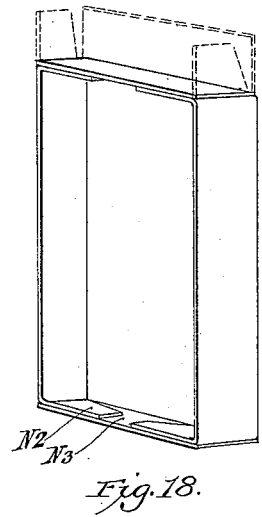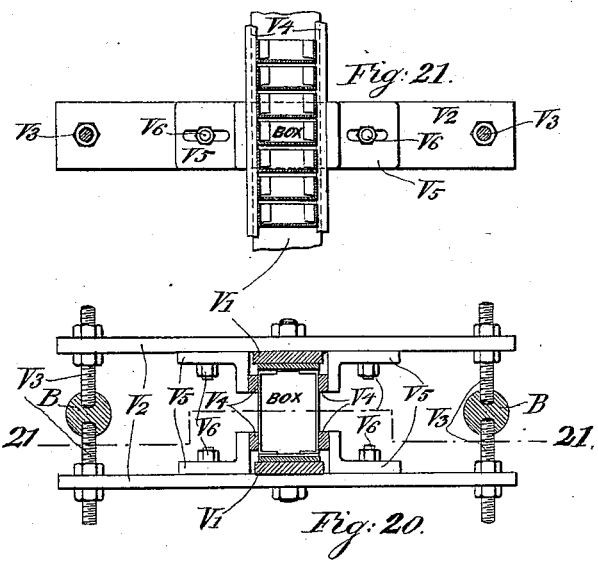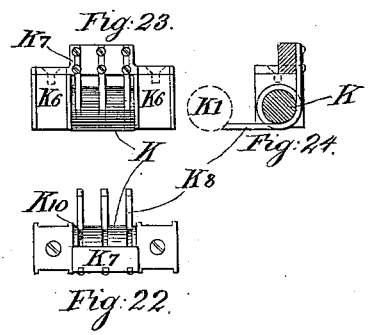

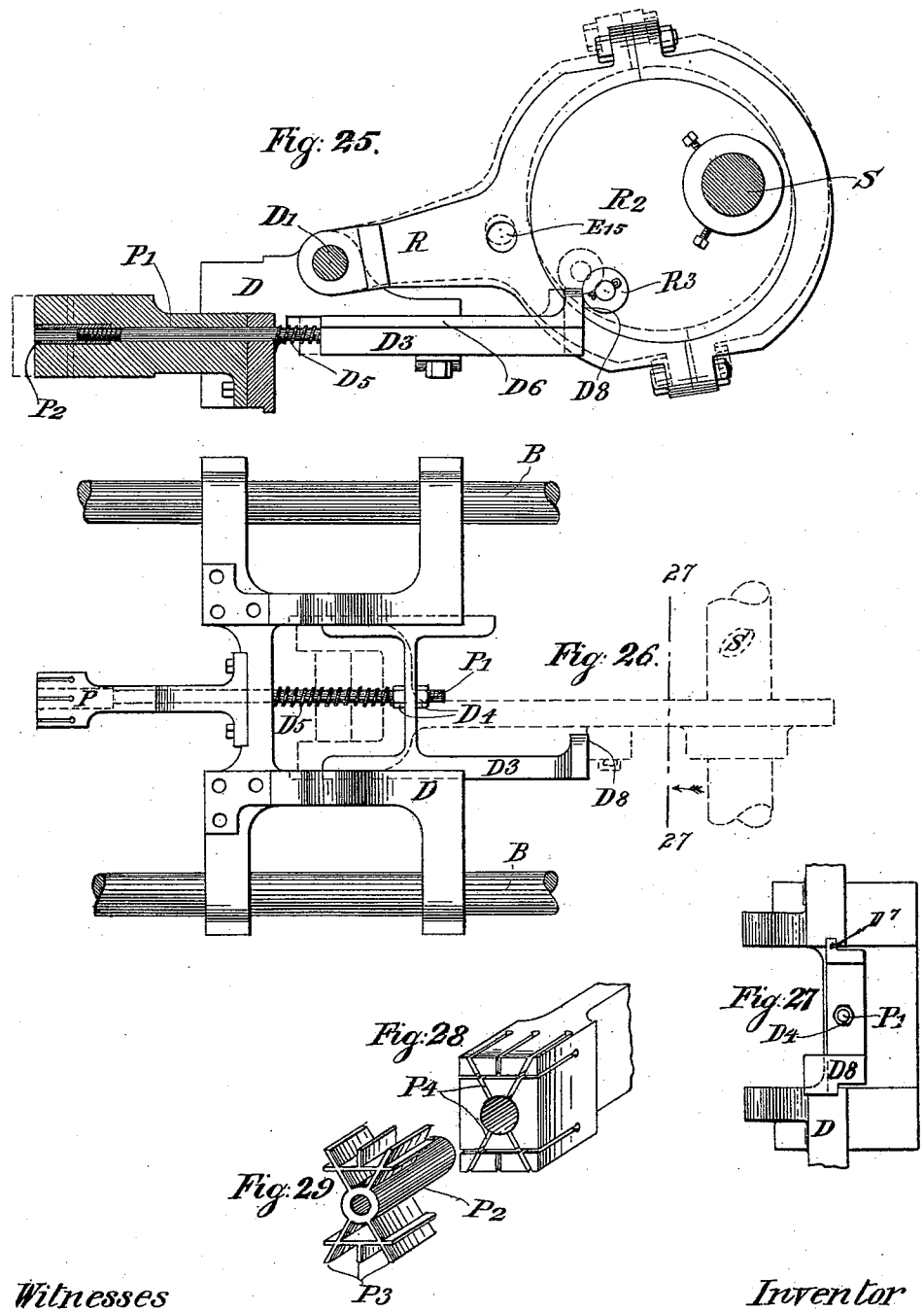

(No Model.) 11 Sheets—Sheet 11.

W. E. WILLIAMS.
MACHINE FOR MAKING MATCH BOXES.

No. 574,842. Patented Jan. 5, 1897.

Witnesses
Fred. Borg
Frank Murphy

Inventor
W. E. Williams

UNITED STATES PATENT OFFICE.

WILLIAM ERASTUS WILLIAMS, OF CHICAGO, ILLINOIS.

MACHINE FOR MAKING MATCH-BOXES.

SPECIFICATION forming part of Letters Patent No. 574,842, dated January 5, 1897.

Application filed March 29, 1895. Serial No. 543,761. (No model.)

*To all whom it may concern:*

Be it known that I, WILLIAM ERASTUS WILLIAMS, a citizen of the United States, residing at Chicago, in the county of Cook and State of Illinois, have invented new and useful Improvements in Machines for Making Match-Boxes, of which the following is a specification.

By the machine to which this invention relates paper is drawn from a roll, carried around gluing devices, and onward to continuously-feeding rollers that move bodily toward and away from forming-dies, where its advance is arrested for an instant that the outward bodily movement of the rollers equals the advance of the paper by the rotation of the rollers. During this instant a blank is formed at the end of the strip by suitable dies, and the next instant this blank is pulled outward and freed from the dies by the bodily outward movement of the rollers. The paper is then immediately and rapidly advanced by the combined feed and bodily return movements, and the next operation of the forming-dies shapes a second blank and severs the first, and so on continuously. The blanks are caught in succession, folded into shape, and carried on in a way which retains them in form until the glue has fully set, when they are discharged in rapid succession ready for use. The machine thus automatically converts a roll of paper into boxes with extraordinary rapidity and, if the paper be ordinarily perfect, without the usual liability to clogging or other untoward occurrence.

Figure 5:
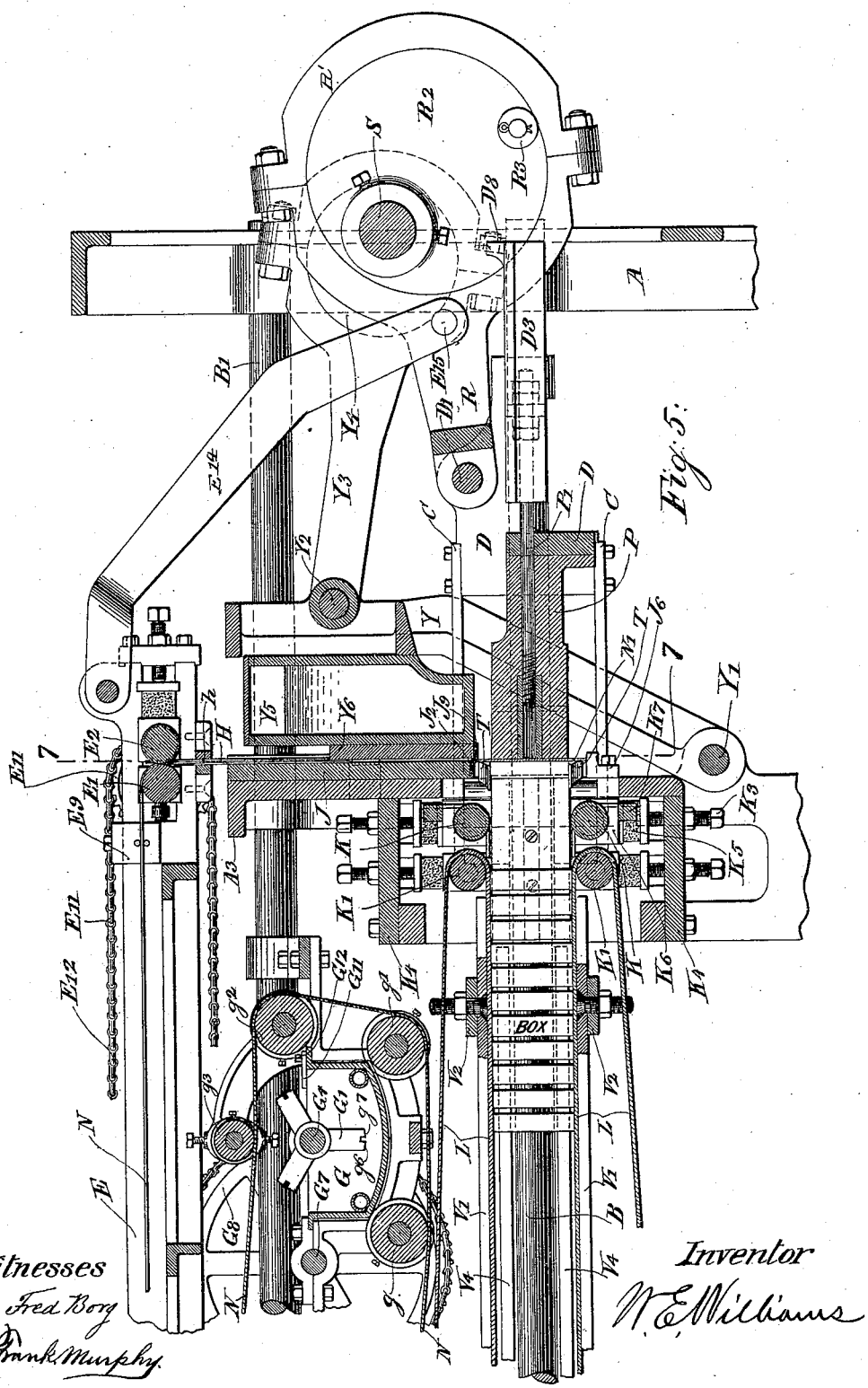
Figure 6:
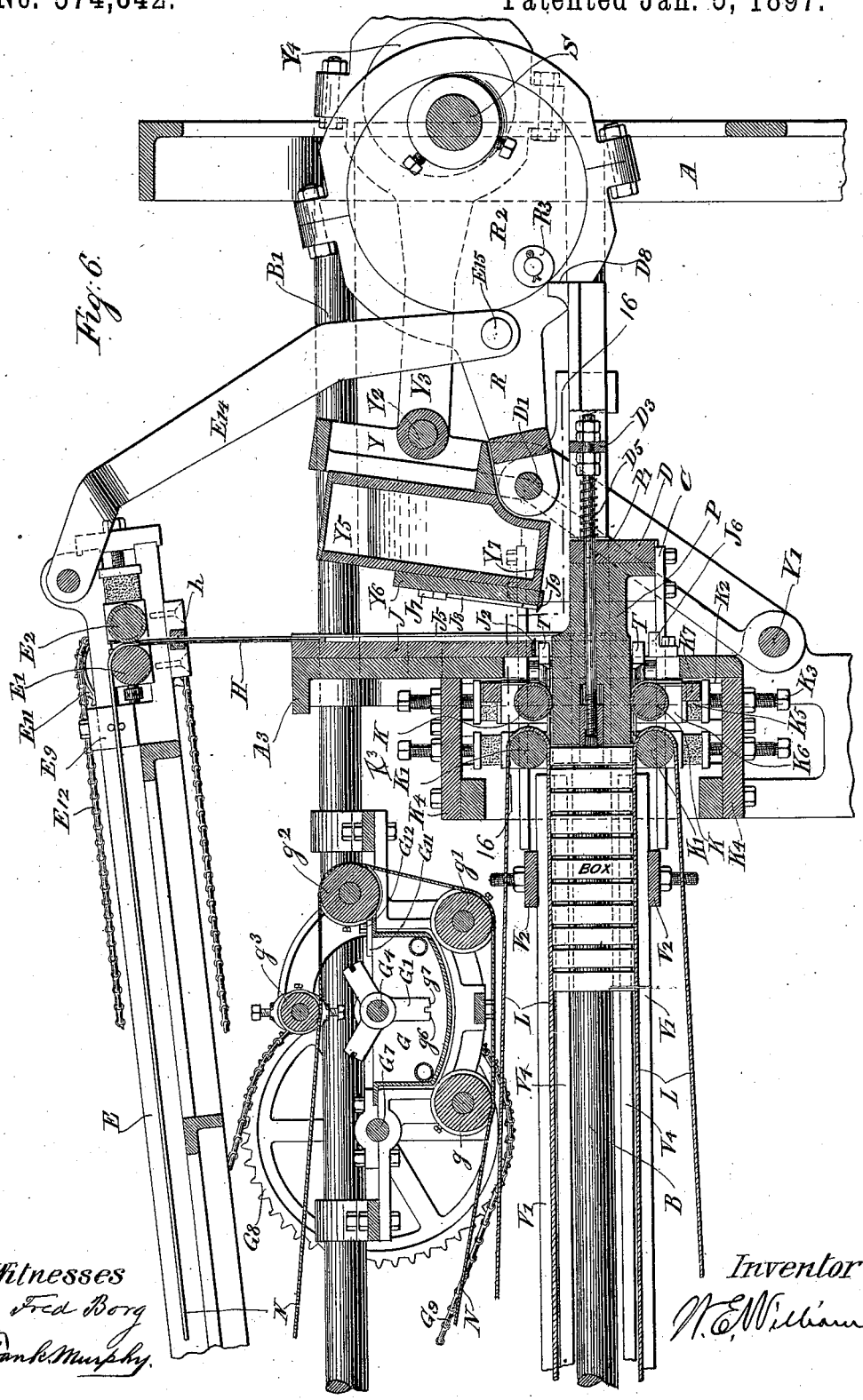
Figure 30:
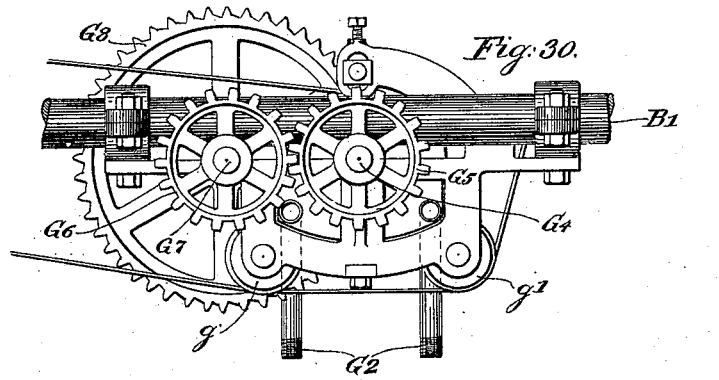
Figure 31:
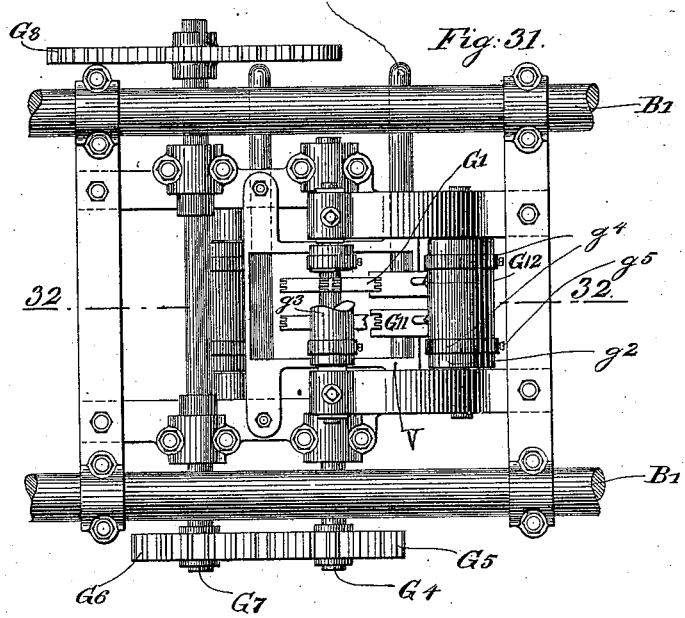
Figure 32:
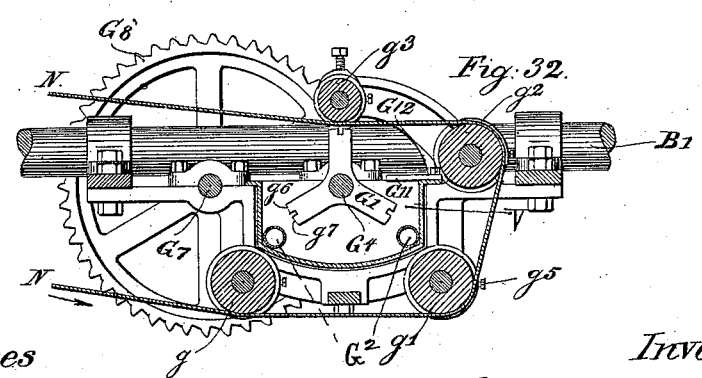

Figures 1, 2, 3, and 4 are respectively plan, side, front end, and rear end views of the machine. Figs. 5 and 6 show operating parts in different positions, the views being longitudinal sectional elevations. Fig. 7 is a section on the line 7 7, Fig. 5. Figs. 8 and 9 show in elevation the platen and die, respectively, for cutting, punching, and scoring the box-blanks. Figs. 10 and 11 are views of a certain paper-guide. Figs. 12 and 13 show details of certain folding die-plates. Figs. 14 and 15 show a guideway leading from the feed-rolls to the die-plates. Figs. 16 and 17 show in section on the line 16 16, Fig. 6, box-folding mechanism, the operating parts being in different positions in the two figures. Fig. 18 shows in perspective the box produced by the machine. Fig. 19 is a section on the line 19 19, Fig. 17, the die-plate proper being removed. Figs. 20 and 21 are respectively sections on the lines 20 20, Fig. 2, and 21 21, Fig. 20. Figs. 22, 23, and 24 are plan, elevation, and section, respectively, showing a certain folding-roller, its bearings, and fender-bars. Fig. 25 is a side view, partly in section, showing a folding-plunger, an eccentric which operates the same, and devices for freeing the box therefrom. Fig. 26 shows in plan, partly dotted, parts seen in Fig. 25. Fig. 27 is a view looking in the direction of the arrows 27, Fig. 26. Fig. 28 is a perspective view of the folding-plunger. Fig. 29 is a similar view of an ejector operating in connection with the plunger. Figs. 30, 31, and 32 are respectively side, plan, and sectional views of certain gluing mechanism.

Figure 1:
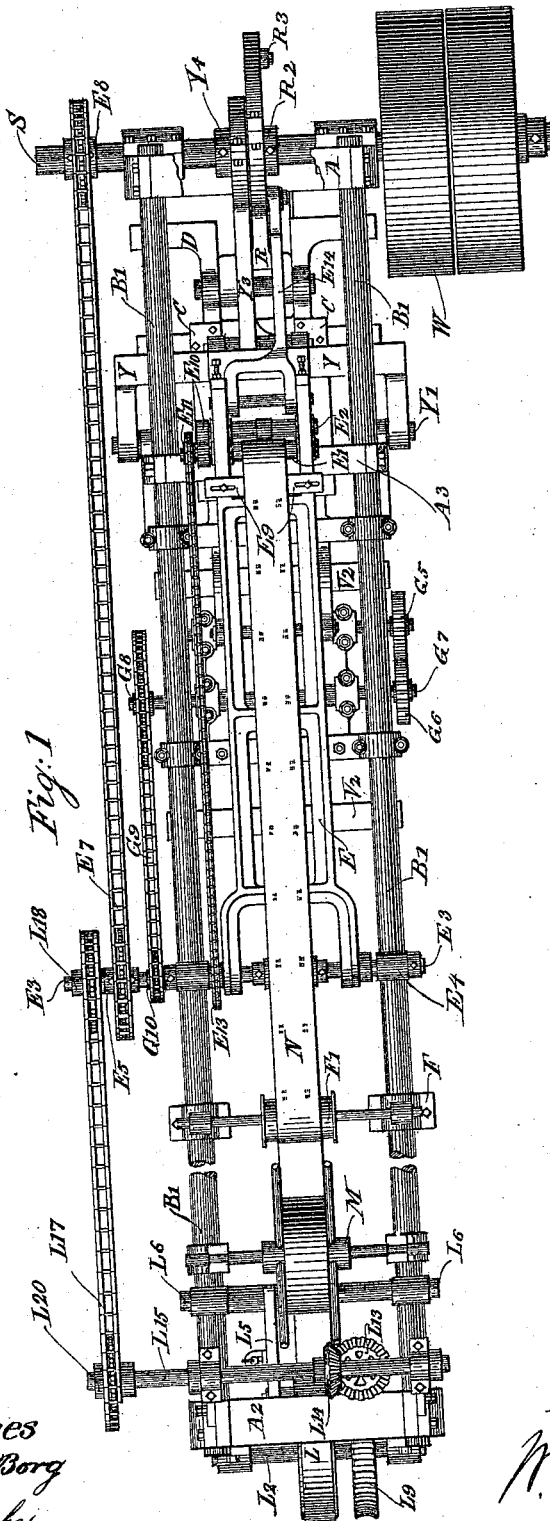
Figure 2:
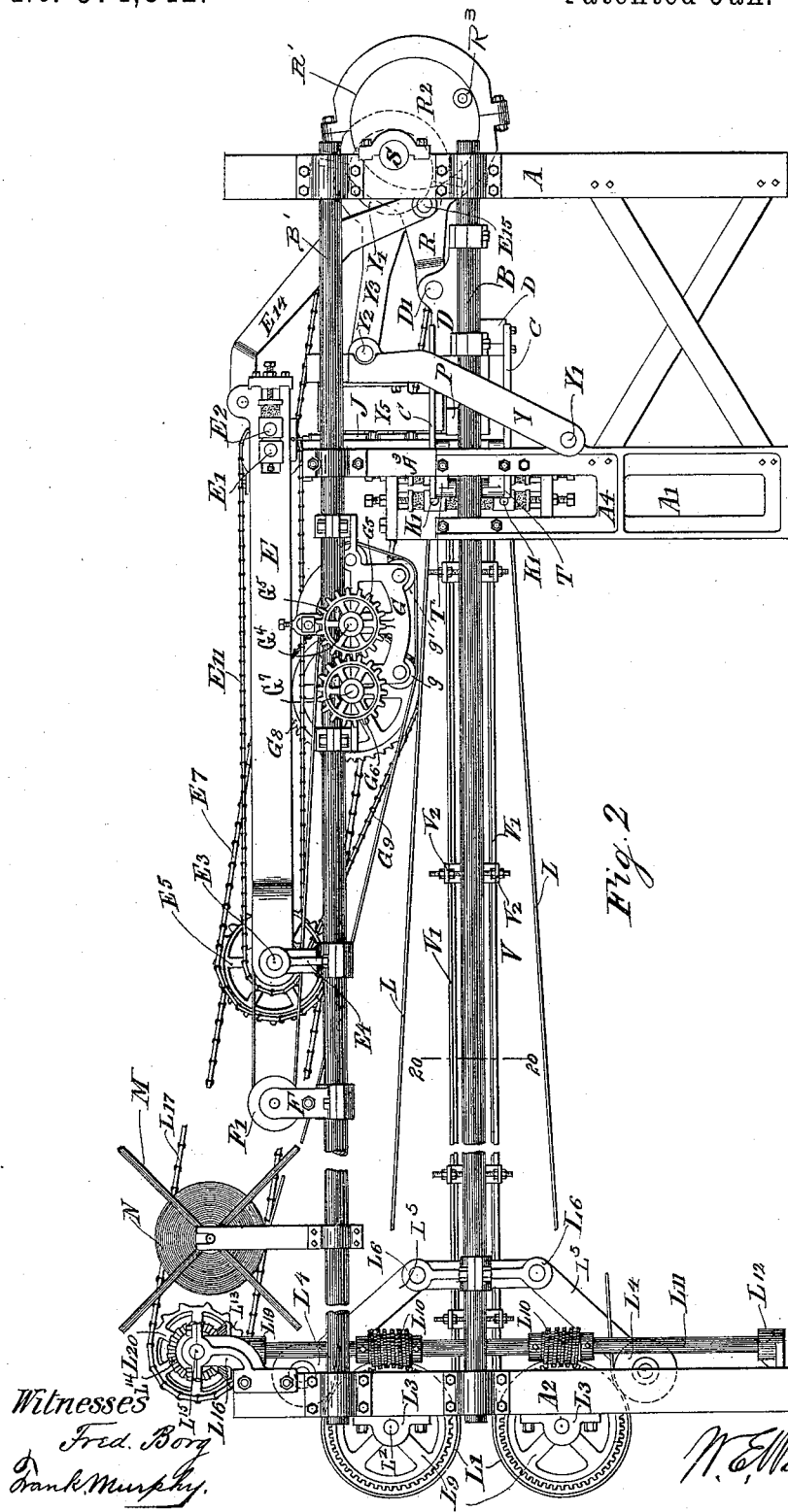
Figure 3:
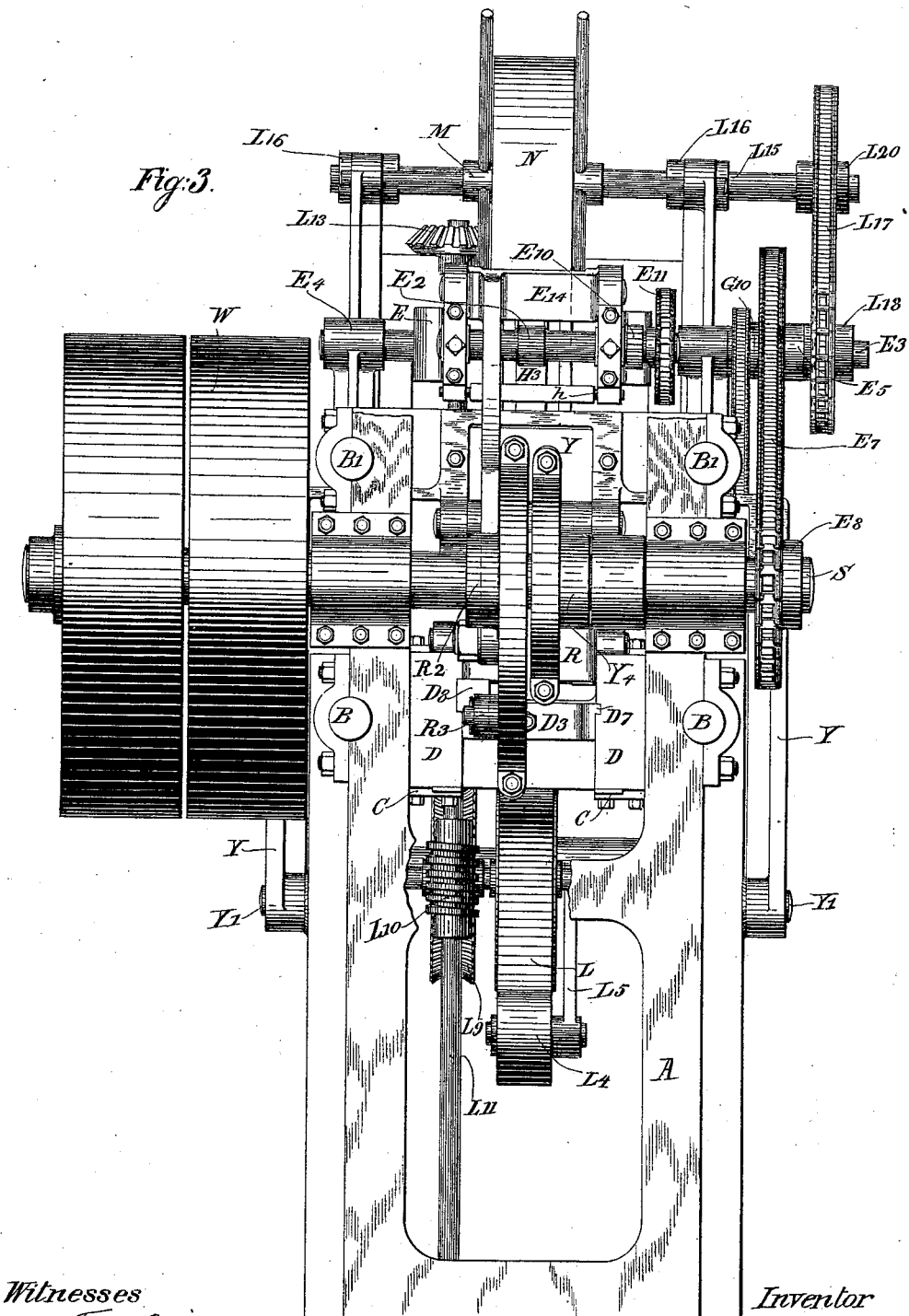
Figure 4:
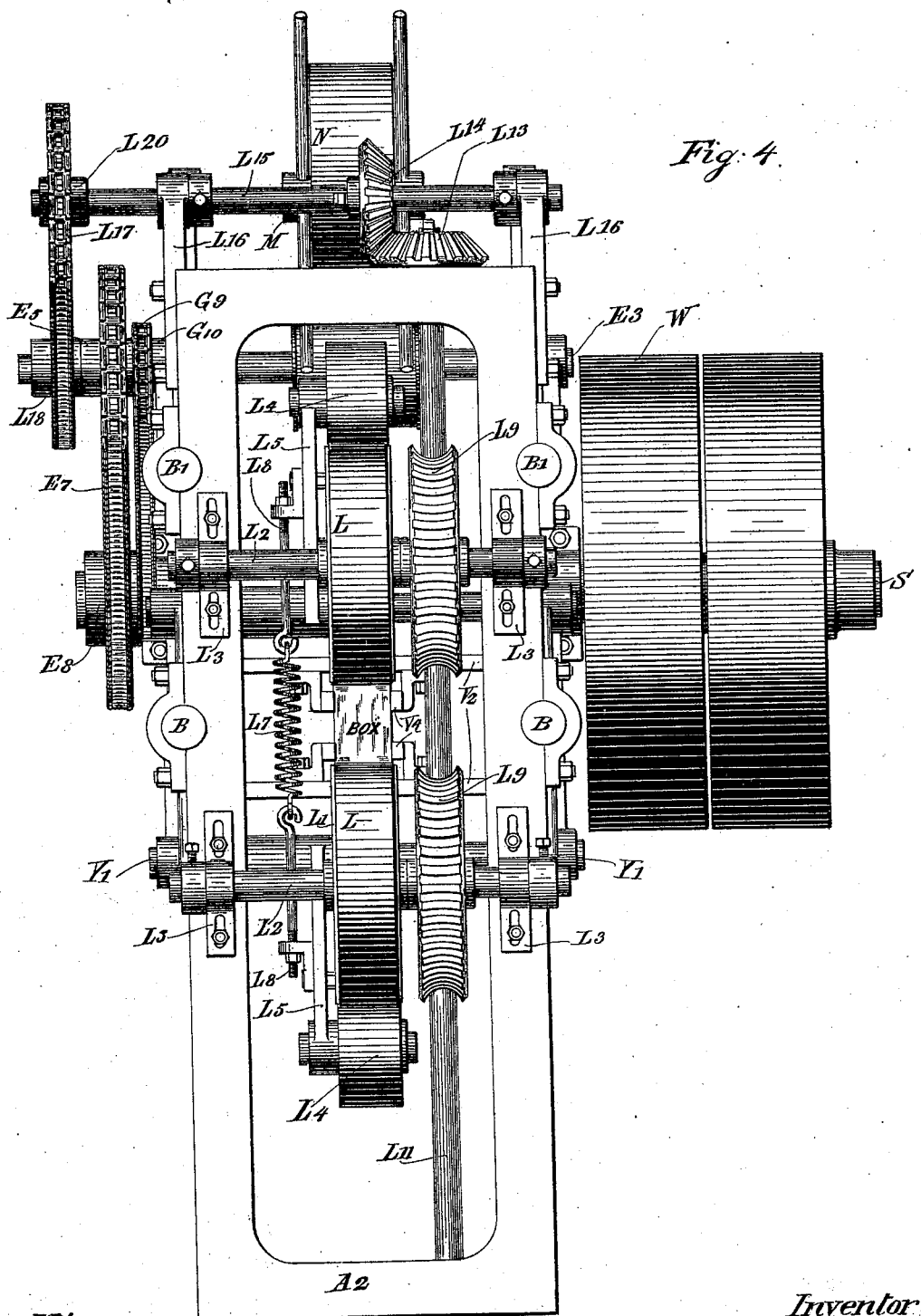

A $A'$ $A^2$ $A^3$ $A^4$, Figs. 1 and 2, are (preferably cast) portions of the frame of the machine, and they are united by four parallel bars B $B'$ and such braces as may be deemed desirable. All the working parts of the machine are operated from a shaft S, driven by a pulley W. Near the other end of the frame a reel M is mounted in bearings adjustably fixed to the upper pair of bars $B'$ $B'$, and upon this it placed a roll N of paper of suitable width. The paper N passes from this roll to feed-rollers $E'$ $E^2$, mounted in or upon and near the end of an arm E, which swings upon a shaft $E^3$, itself mounted in bearings adjustably secured upon the bars $B'$ $B'$. The course of the paper in passing from the reel to the feed-rollers is not direct, but around gluing devices at G, back around a roller $F'$, turning in bearings also adjustable upon the bars $B'$ $B'$, and then again forward to the feed-rollers, whereby the interval between the application of the glue and the pressing together of the parts of the folded blank is sufficient to allow the glue to slightly penetrate and thus firmly adhere to the paper, and also to become more tacky by partially drying and cooling.

The gluing mechanism consists of a receptacle V, provided with any suitable glue-heating steam-pipe $G^2$ and mounted in a frame G, adjustably supported upon the bars $B'$ $B'$, Figs. 30, 31 and 32; shafts $G^4$ $G^7$, mounted in the frame, geared together and driven by a chain belt $G^9$, Fig. 1, from the shaft $E^3$; two three-armed spiders $G'$, fixed to the shaft $G^4$ and having the ends of their arms slotted in two directions to form rows of separate points; a series of strip-carrying rollers $g$ $g'$ $g^2$ $g^3$, the latter above the shaft $G^4$ and adjustable in distance therefrom, and all having adjustable guide-rings $g^4$, held in place by set-screws $g^5$, and adjustable scrapers $G^{11}$ for removing surplus glue from the ends of the spider-arms and preventing the slots therein from filling up. The parts being properly adjusted, the paper passes continuously around the rollers $g$ $g'$ $g^2$, and the movements are so timed that as each spider-arm, passing upward past the scraper, reaches a vertical position the strip is pressed between it and the roller $g^3$, and glue is thus deposited near each margin of the strip in a row of spots on each side of the line along which the strip is to be cut, later, to form separate blanks. The groove seen in Figs. 31 and 32 prevents the deposition of glue upon this line, and those seen only in Fig. 31 are merely for causing the glue to be applied upon each side of the line in distinct spots. The reason for the latter grooves lies in the fact that glue may thus be applied liberally enough to secure certainty without danger of fouling the machine, for should there chance to be any excess when pressure is applied it may spread out without passing the edges of the blank.

The shaft $E^3$, already mentioned as the axis about which the arm E swings, is driven from the shaft S by means of sprocket-wheels and a chain belt $E^7$, and the arm E is carried out and back, rocking upon this axis during each revolution of the shaft S by means of a link $E^{14}$, connecting it with the strap $R'$ of an eccentric $R^2$ upon the shaft. The feed-rollers borne by the arm are cut away so that they bear upon the strip of paper only alongside the lines of glue spots thereon. The rollers are adjustable to allow for different thicknesses of paper, and preferably an elastic strip is interposed in the usual manner to permit automatic adjustment for chance inequalities. Between the rollers $E'$ $E^2$ depends a guideway H, pivoted to the arm E at $h$ and having front and back plates $H^2$ $H'$, the former in strips which lie alongside the path of the glued portions of the paper strip. The front and back plates are thin and elastic and are connected below the pivotal line by short blocks $H^6$ only, and hence are readily flexed to a slight extent. The die-plate J, to which this guideway directs the strip, is secured to a frame-web $A^3$ and is provided with an inlaid punching and scoring plate $J'$, having punching-apertures $J^3$ extending also through the web to allow the escape of the pieces cut out, and also with scoring-grooves $J^4$, continued in the plate J, which further carries at its lower edge a knife $J^2$. At the sides of the die-plate are guides $J^5$, which laterally support the strip and also the severed blank, which rests for an instant after severing upon a support $J^6$. In front of the plate J is a platen Y, hinged to the frame at $Y'$ and driven by an arm $Y^3$ from the strap of an eccentric $Y^4$ upon the shaft S. The platen carries a water-box $Y^5$ for purposes that will appear, and upon the face of this is fixed a plate $Y^6$, provided with punches $J^7$, scoring-plates $J^8$, and a cutting-blade $J^9$, all coacting with parts fixed to the web $A^3$.

Below the dies is a plunger P, which plays back and forth through an opening $A^7$ in the web $A^3$, between rollers K K and up to rollers $K'$ $K'$, that carry conveyer-belts L L, between which the plunger delivers box-blanks that in its advance it has folded into complete boxes. The plunger is bolted to a cross-head D, sliding upon the lower pair of bars B B and actuated by an arm R from the strap of an eccentric $R^2$, already mentioned as actuating the feed-roller arm E.

The dies may be changed or replaced by others for boxes of different sizes, and to correspondingly change the opening $A^7$, as well as to compensate wear, that opening is lined with removable plates $A^9$ and the adjacent surface is faced with removable plates $A^8$. When the plunger advances, it presses into the aperture the blank just formed and resting upon the adjustable support $J^6$, and thus folds the blank's lateral margins against the sides of the plunger, but leaves the upper and lower flaps projecting, the opening being vertically of greater dimensions than the plunger.

Besides the plunger the cross-head carries, both above and below the plunger, a pair of rigid plates C, Figs. 16, 17, and 19, provided with grooves or ways $C'$ to receive pins $T'$ upon tuckers T of L shape, pivoted at one end to parts $A^6$ of the frame. As the plunger advances the ways force the pins $T'$ inward and thus compel the tuckers to swing inward upon their pivots at the proper instant and to fold in against the plunger the free ends of the two box sides which have already been folded. The distance of each pivot $T'$ from the plunger is a large fraction of its distance from the tucker's free end, and hence that end not only pushes the flap inward, but also follows it as it is carried bodily onward by the plunger. But for this the friction of the tucker upon the flap would tend to drag the latter out of place and cause it to project above the end of the finished box. The instant after the action of the tuckers is completed the constantly-advancing plunger pushes between the rollers K K, which fold the ends of the box and press them down upon the flaps just tucked in, and advances to the position shown in Fig. 6; but just at the completion of the advance the box is pushed off the end of the plunger and fairly entered between the belts L L by a detacher (shown in Figs. 6, 25, 26, 27, 28, and 29 and made up of intersecting webs $P^3$, of metal, parallel to the plunger's axis) connected to a central sleeve $P^2$ and normally lying wholly within corresponding recesses in the plunger with their outer edges coincident with the surfaces of the latter. To this sleeve is secured a rod P', running back through the plunger and adjustably secured by nuts $D^4$ to a frame $D^3$, which slides in ways in the cross-head and is provided with a projection $D^8$, lying in the path of a roller $R^3$ upon the eccentric $R^2$. At the proper instant, just before the plunger completes its advance, the roller strikes the projection and projects the detacher from the end of the plunger to push the box from the same. An instant later the roller leaves the projection, and the detacher is retracted by a spring coiled about the rod P' at $D^5$, but as its webs present little frictional surface to the walls of the box the latter is never drawn back with it. To guard against possible accumulation of glue or other matter upon the plunger, the latter is kept wet by allowing water to trickle upon it through apertures $Y^7$ in the water-box $Y^5$, already mentioned. The rollers K K above and below the plunger are mounted in bearings $K^6$ $K^7$, that slide in ways in the frame and are adjusted by set-screws $K^3$ to fit any plunger and to exert any desired pressure upon the box thereon, and in order that the pressure may be elastic cushions $K^5$ are interposed to receive the force of the set-screws and transmit it to the blocks. The blocks K' are similarly mounted.

In order that the newly-folded portions of the box may not spring apart in passing from the rollers K to the belts L, the rollers are grooved at $K^{10}$, and in the grooves lie bent fender-bars $K^8$, fixed to the bearings $K^6$ $K^7$ and extending rearward to the rollers K'. The belts L L being flexible and running upon two sides only of the boxes which they convey, they would not of themselves hold the boxes securely until the glue became set sufficiently to itself hold them with certainty. Therefore rigid plates V', Fig. 20, are fixed above and below the belts to cross-bars $V^2$, adjustably held between nuts upon threaded studs screwed into the bars B, and the lateral walls of the boxes are supported by bars $V^4$, fixed to brackets $V^5$, adjustably secured to the cross-bars by bolts $V^6$. It is plain that the way formed by these devices may be made uniform from end to end and may be varied in height, in width, or in both dimensions to suit different boxes.

The belts L are endless and pass over pulleys L' upon shafts $L^2$, mounted in bearings $L^3$, which are adjustable on the frame in order that the separation of the pulleys may be varied to correspond with given vertical dimensions of the way just described. These pulleys are driven by worm-gears $L^9$ upon the same shafts, actuated from the shaft $E^3$ by means of chain belt $L^{17}$, shaft $L^{15}$, bevel-gears $L^{14}$ $L^{13}$, shaft $L^{11}$, and worm $L^{10}$.

Constant tension is kept upon the conveyer-belts by means of pulleys $L^4$, mounted at the ends of arms $L^5$, pivoted at $L^6$ to bearings upon the bars B B' and drawn together and against the outer folds of the belts, respectively, by a spring $L^7$ and links adjustably secured at $L^8$ to projections from said arms.

The feed-rollers are geared together and are positively driven by a chain belt $E^{11}$ and sprocket-wheels mounted, respectively, upon the shaft of one roller and the shaft $E^3$, upon which the arm swings. The rollers revolve with a constant, slow speed, but as the inward swing of the arm is added to the normal rate of feed the strip shoots between the dies with very unusual velocity. As the arm moves outward the two movements offset each other and the dies act. The next instant the arm's motion predominates and the paper is pulled back and freed from the dies. This latter result is of the greatest importance, for the dies often and unavoidably hold undetached parts or filaments of the paper, and if, as in the usual machine, the paper is pushed directly forward without first detaching it, it buckles instead of advancing. To avoid trouble from this cause requires constant, alert attention; but no matter what the adherence to the dies the paper may be pulled free from them, since this requires only tensile strength in the paper and not resistance to flexure.

Usually, in changing the size of the boxes the rollers E' $E^2$, the dies, and the plunger are changed; but it is evident that the rollers may be unchanged if the speed be properly regulated.

The swinging arm E is chosen to illustrate bodily movement of the rollers, it being simply one simple way of accomplishing the desired end. It has the defect of giving curvilinear motion, but this is not serious and the slight flexibility of the guideway H diminishes the difficulty. Practically this construction works so satisfactorily that it has been chosen for illustration instead of one of the many possible devices for giving rectilinear motion which are within my invention. In the glue-applying apparatus it is evident that the number of spider-arms may be varied, but at the high speed at which this machine runs it has been found that three give excellent results.

The rollers K need not revolve, necessarily, but may be fixed, but adjustable, rounded blocks.

The belts L move a little more than the depth of a box during the interval between successive advances of the plunger, and hence the boxes stand slightly separated in the conveyer. This interval may be changed by varying the relative sizes of the sprocket-wheels for the chain belt $L^{17}$.

What I claim is—

1. The combination with the folding-plunger, of a box-detacher lying normally within the plunger and having faces adapted to support the box-walls by contact with a small portion only of their surfaces, and means for projecting said detacher from the end of the plunger at intervals; whereby the box upon the plunger may be pushed therefrom and not be drawn back with the retracting detacher.

2. The combination with a suitably-mounted plunger, of a box-detacher sliding in the plunger in the line of its motion, means imparting reciprocatory motion to both plunger and detacher, and devices arranged to project the detacher from the end of the plunger while both advance.

3. The combination with a reciprocating cross-head carrying a folding-plunger, of a box-detacher carried by the plunger, and a rotary shaft bearing devices for accelerating the advance of the detacher at suitable intervals, substantially as set forth.

4. The combination with the adjustable box-pressing rollers K, of the fender-bars lying in grooves therein and projecting in the rear of the same to hold the box-flaps in position as they pass the line of pressure of the rollers.

5. The combination with the folding-rollers K and the fender-bars, of the conveyer-rollers K' and the belts L, substantially as set forth.

6. The combination with the plunger, of folding-plates fixed upon opposite sides of the plunger's path to fold two sides of the box-blank carried by the plunger, pivoted tuckers arranged to swing inward and onward with the plunger to fold the flaps or ends of said sides, and rollers mounted in front of the tuckers to fold the remaining sides of the blank back upon the advancing plunger.

7. The combination with the swinging arm carrying the feed-rollers, of devices arranged to apply glue to the marginal portions of the paper before it reaches said rollers, and a guideway attached to said arm in position to receive the paper from the rollers and provided with open spaces permitting the glued portions to pass through without contact.

8. The combination with the box-drying conveyer and the belts running therein, of the adjustably-connected belt-tightening rollers pressing, respectively, upon the two belts; whereby the tension may be varied yet must always be the same upon the two belts.

9. The combination with the adjustable conveyer-way, of the adjustable pulleys or drums at the ends thereof, the belts carried by said pulleys and running in said way, the worm-wheels mounted upon the pulley-shafts, the worms engaging said wheels, and means for rotating said worms.

In witness whereof I have hereunto subscribed my name, on this 27th day of February, A. D. 1895, in the presence of two subscribing witnesses.

WILLIAM ERASTUS WILLIAMS.

Witnesses:
BERTHA DUPPLER,
FRED BORG.